United States Patent
D'Souza et al.

(10) Patent No.: US 7,526,803 B2
(45) Date of Patent: Apr. 28, 2009

(54) DETECTION OF DENIAL OF SERVICE ATTACKS AGAINST SIP (SESSION INITIATION PROTOCOL) ELEMENTS

(75) Inventors: Scott David D'Souza, Ottawa (CA); Dmitri Vinokurov, Ottawa (CA)

(73) Assignee: Alcatel Lucent, Paris (FR)

( * ) Notice: Subject to any disclaimer, the term of this patent is extended or adjusted under 35 U.S.C. 154(b) by 939 days.

(21) Appl. No.: 10/713,035

(22) Filed: Nov. 17, 2003

(65) Prior Publication Data

US 2005/0108567 A1 May 19, 2005

(51) Int. Cl.
*G06F 21/00* (2006.01)
(52) U.S. Cl. .......................................... 726/22; 370/229
(58) Field of Classification Search ................ 726/2, 726/3, 13, 15, 22, 23, 25; 713/151, 152, 713/154, 160; 370/229, 230, 352, 356, 401
See application file for complete search history.

(56) References Cited

U.S. PATENT DOCUMENTS

| | | | |
|---|---|---|---|
| 2002/0129236 A1* | 9/2002 | Nuutinen | ..................... 713/151 |
| 2002/0131575 A1 | 9/2002 | Gallant | |
| 2003/0043740 A1 | 3/2003 | March et al. | |
| 2005/0259667 A1* | 11/2005 | Vinokurov et al. | .......... 370/401 |

OTHER PUBLICATIONS

B. Reynolds et al: "Secure IP Telephony using Multi-layered Protection," Feb. 7, 2003: retrieved from the Internet: URL:http://seclab.cs.ucdavis.edu/papers/reynolds-ndss03.pdf.
Reynolds et al, *Secure IP Telephony Using Multi-Layered Protection*, Proceedings of NDSS '03, Feb. 2003 (13 sheets).

* cited by examiner

*Primary Examiner*—Gilberto Barron, Jr.
*Assistant Examiner*—Abdulhakim Nobahar

(57) ABSTRACT

A method and apparatus directed to detecting DoS (denial of service) attacks against SIP enabled devices. A substantial imbalance between an accounting of SIP INVITE (INV) and SIP 180 Ringing ($N_{180}$) messages indicates a DoS attack. Preferably the number (H) of INVITE messages including credentials ($INV_c$) that are sent from a user client in response to a 407 Authentication Required message from a proxy server are removed from the accounting before the balance is tested. If the equation $INV_o + INV_c - H = N_{180}$ (where $INV_o$ is the number of INVITE messages without credentials) is not true within a small margin of error then the presence of a current DoS attack on the proxy server is indicated by the inequality.

7 Claims, 3 Drawing Sheets

SIP Architecture

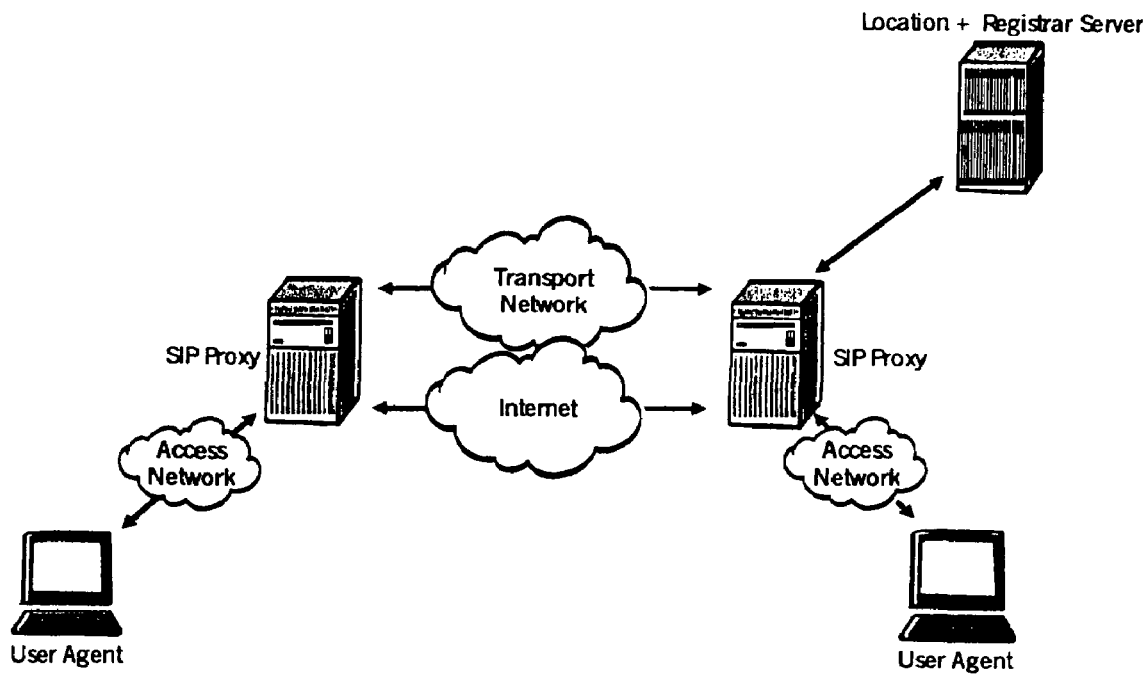
Figure 1: SIP Architecture
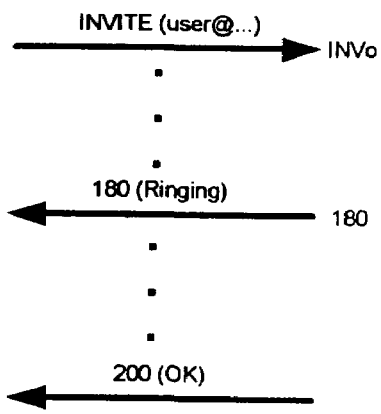
Figure 2: Unauthenticated Call Initiation

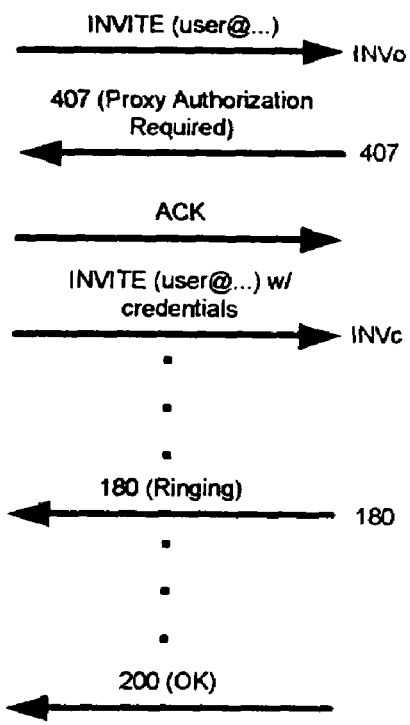
Figure 3: Full Authentication Call Initiation
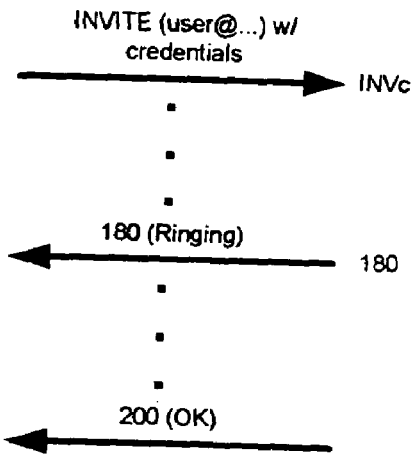
Figure 4: Pre-authenticated Call Initiation
$$0 \approx INV_o + INV_c - H - N_{180}$$
$N_{180}$ represents outgoing *180 Ringing* messages.
Figure 5: Attack Detection Equation

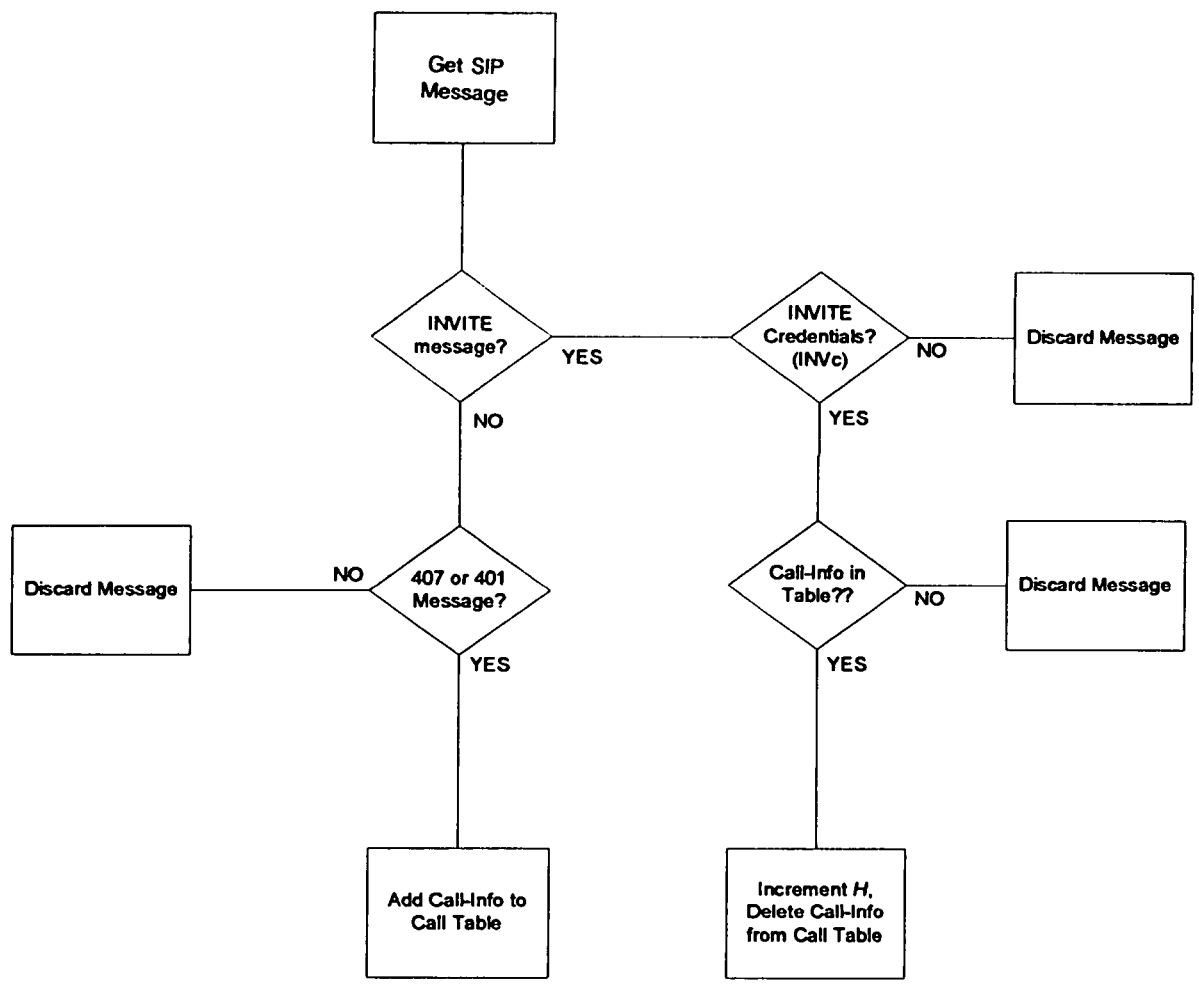
Figure 6: Hit Table Flowchart

DETECTION OF DENIAL OF SERVICE ATTACKS AGAINST SIP (SESSION INITIATION PROTOCOL) ELEMENTS

BACKGROUND AND BRIEF DESCRIPTION OF THE INVENTION

A denial of service attack involves blocking somebody's ability to use some service on a network. Denial-of-Service (DoS) attacks are common across the Internet with many being launched daily at various targets. Many of the attacks involve specially constructed packets or messages designed to either take advantage of flaws in software, or to tie up resources within devices (packet flooding attacks). In some cases, these packet flooding attacks can be directed at devices providing Session Initiation Protocol (SIP) functionality.

SIP is an application level protocol providing multimedia signaling functionality across packet networks. SIP user agents and proxy servers can be used as building blocks to construct IP telephony networks. An example SIP network is depicted in FIG. 1. Typical successful SIP message exchanges between a User Agent Client (UAC) and a proxy server for a call initiation are depicted in FIGS. 2, 3 and 4.

The SIP network architecture can be very flexible, with components distributed throughout IP networks, some trusted (private transport networks), some not (Internet). Once SIP components are connected to a network that cannot be trusted, the system becomes vulnerable to attacks.

A malicious user can send message floods against SIP elements (as defined in IETF RFC 3261) and render them partially or completely unusable to other users on the network. The present invention provides a solution for detecting malicious INVITE message floods against SIP elements.

In general, for an INVITE flood, the malicious user sends many INVITE messages to a SIP element. The SIP element encounters resource exhaustion when it attempts to keep track of the large number of calls. When legitimate users attempt to make a call, the SIP element is unable to process the messages due to a lack of resources (memory, CPU, etc).

The closest prior art solution to the problem is disclosed in an article by B. Reynolds, and D. Ghosal entitled "*Secure IP Telephony using Multi-layered Protection*", Proceedings of NDSS '03, February 2003 (hereinafter "Reynolds et al). In Reynolds et al, a method is proposed for detection of SIP INVITE message flooding attacks. For each end user, the balance between INVITE and OK messages is used to determine whether the user is under attack. The method uses cumulative sum based change-point detection to analyze when the difference between INVITE and OK is too large.

This prior art solution provides no mechanisms for protecting the infrastructure of the SIP network and the domain of the service provider. An attacker could send a message flood through a proxy server against a non-existent end user. This could result in denial-of-service for all users served by the proxy server. The method described here provides detection mechanisms for the network infrastructure (core and edge proxy servers, etc).

Secondly, this prior art does not take SIP authentication into account. For many systems, some or all of the users will be forced to authenticate themselves to the proxy server when sending INVITE requests. When authentication is introduced the method proposed in this prior art fails.

Finally, the prior art solution uses the balance of SIP INVITE vs. OK messages. The OK message is only sent once the destination user chooses to answer a call. Each user that does not answer their phone results in an imbalance. This could result in additional false positives.

THE PRESENT INVENTION

The present invention provides method and system for detecting DoS (denial of service) attacks against SIP enabled devices. The invention is characterized in that a substantial imbalance between an accounting of SIP INVITE (INV) and SIP 180 Ringing ($N_{180}$) messages indicates a DoS attack. This is distinguishable from the prior art, which teaches using an accounting of SIP INVITE and SIP OK messages resulting in more false positives than the present solution.

Preferably, the number (H) of INVITE messages including credentials ($INV_c$) that are sent from a user client in response to a 407 Authentication Required message from a proxy server are removed from the accounting before the balance is tested. That is, if the equation $INV_o + INV_c - H = N_{180}$ (where $INV_o$ is the number of INVITE messages without credentials) is not true within a small margin of error then the presence of a current DoS attack on the proxy server is indicated by the inequality.

DESCRIPTION OF THE DRAWINGS

The above and other objects, advantages and features of the invention will become more apparent when considered with the following specification and accompanying drawings wherein:

FIG. 1 depicts an embodiment of SIP network architecture incorporating the invention, FIG. 2 depicts the message handshakes for an unauthenticated SIP call initiation, FIG. 3 depicts the "full" message handshake for a user requiring authentication, FIG. 4 depicts the message handshake for a user with information allowing pre-authentication as described in IETF RFC 2617, FIG. 5 depicts a possible calculated value for detecting SIP INVITE flooding attacks, and FIG. 6 depicts the flow chart for determining whether an $INV_c$ message is part of a full authentication handshake, or a pre-authenticated handshake.

DETAILED DESCRIPTION OF THE INVENTION

The present invention examines the balance between incoming INVITE and outgoing 180 Ringing messages. The 180 message is re-sent by the server once the destination user agent has been identified and has been successfully contacted. The 180 message is sent regardless if the end user answers the call or not and thus identifies a legitimate call.

The present invention differentiates between INVITE messages with authentication credentials given in the "Proxy-Authorization" header field ($INV_c$) and those without ($INV_o$). For a system with no authentication enabled (FIG. 2), the number of $INV_O$ messages should be approximately equal to the number of 180 Ringing messages. In a system with authentication enabled for all users (FIG. 3) the number of $INV_c$ messages will be approximately equal to the number of 180 messages. For these systems it is possible to use change-point detection techniques to determine when the two values suddenly are out of balance. The imbalance indicates that a flooding attack is underway.

Detection is more difficult when the system is mixed, with only some users requiring authentication. For the "full" authentication handshake described in FIG. 3 there is an $INV_o$ and an $INV_c$ message for a single 180 Ringing message whereas for the handshakes in FIGS. 2 and 4 there is only one INVITE message per 180.

According to this embodiment, a preferred system utilizes an SIP proxy server to receive SIP messages, determines whether the SIP messages are INVITE or 180 messages (and, optionally, 407 or 401 messages), identifies the "full" authentication handshake, and then determines whether an imbalance exists based on the number of INVITE messages with credentials upon taking into account "full" authentication handshake. This may be accomplished by means of the software illustrated in FIG. 6, which includes a table containing unique call-info values. The call-info could consist of call-IDs or digest authentication nonces. When a 407 Authentication Required message is sent from the proxy server to a UAC, the call-info from that message is stored within the table.

For each $INV_c$ message that is received by the proxy, the call-info table is searched. If the call-info from the $INV_c$ message appears in the call-info table, this indicates that the $INV_c$ message is part of a "full" authentication handshake. We label the number of matches as parameter H. When a match is found in the table, the entry is then deleted.

The H value can now be used to adjust the balance equation and improve the accuracy of detection. One possible equation for detection is shown in FIG. 4.

The same approach can be used for detection of INVITE flooding attacks against User Agents. In this case the invention uses the authentication information found in the 401 Unauthorized messages instead of 407 messages.

The invention allows for analysis of aggregated traffic rather than maintaining statistics per user as is done in Reynolds et al. The problem with per user statistics is the analysis engine may suffer from resource exhaustion due to tracking a large number of users. An aggregated solution does not suffer from this problem.

Secondly, the invention takes systems with authentication enabled into account. It is very likely that at least some of the users will require authentication, so it is not possible to disregard this aspect.

Finally, using the 180 Ringing message rather than the OK message results in less false positives, as answering the call by the destination user is not taken into account in the approach disclosed herein.

While there will be small errors introduced into the system by legitimate calls to incorrect destinations or calls where the user is already on the phone, in these situations the proxy server will receive the INVITE messages, but there will not be any 180 Ringing messages. This should generally occur rarely and should greatly not affect the accuracy of the method.

The ability to detect DoS attacks against SIP-enabled devices is of great value to operators of network services. Efficient DoS detection mechanisms may prove to be value-adding differentiators in the network equipment market. Competitors who add such features to their network equipment may find themselves at an advantage.

While the invention has been described in relation to preferred embodiments of the invention, it will be appreciated that other embodiments, adaptations and modifications of the invention will be apparent to those skilled in the art.

What is claimed is:

1. A method of detecting denial of service (DoS) attacks in an Internet accessible network having at least one proxy server incorporating a session initiation protocol (SIP), said SIP including incoming INVITE messages that request set-up of an Internet telephone call and outgoing 180 Ringing messages that indicate ringing, the method comprising:

aggregating said INVITE messages and said 180 Ringing messages for all users on said Internet accessible network;

detecting an imbalance between a number of said INVITE and 180 Ringing messages resulting from a DoS attack; and providing an indication of a presence of a current DoS attack on said proxy server based on detection of said imbalance.

2. The method of claim 1,
wherein a number (H) of INVITE messages including credentials that are sent from a user client in response to an authentication required message from the proxy server, said credentials being information used by the proxy server to authenticate the INVITE messages, are removed from an accounting before the imbalance is tested such that when an equation:

$$INV_o + INV_c - H = N_{180}$$

where $INV_o$ is a number of INVITE messages without said credentials, $INV_c$ is a number of INVITE messages with said credentials, and $N_{180}$ is a number of said 180 Ringing messages, is not true within a predetermined margin of error, then the presence of said current DoS attack on the proxy server is indicated by an inequality in said equation.

3. The method of claim 2, further comprising:

creating a call information table at said proxy server for determining a value of H.

4. A system for detecting denial of service (DoS) attacks against session initiation protocol elements in an Internet accessible network having at least one proxy server, said system comprising:

means for aggregating incoming INVITE messages and outgoing 180 Ringing messages for all users on said Internet accessible network; and means, within said proxy server, for determining if a number of said INVITE messages including credentials ($INV_c$) sent to said proxy server from user clients in response to an authentication requirement exceeds a number of said 180 Ringing messages that indicates a DoS attack, said credentials being information used by the proxy server to authenticate the INVITE messages.

5. A system for detecting denial of service (DoS) attacks in an Internet accessible network having at least one proxy server incorporating a session initiation protocol (SIP), said system comprising:

means for aggregating incoming INVITE messages and outgoing 180 Ringing messages for all users on said Internet accessible network; and means, within said proxy server, for detecting an imbalance between a number of said INVITE and said 180 Ringing messages, the imbalance indicating a presence of a current DoS attack on said proxy server.

6. The system of claim 4, wherein said means for determining creates a call-info table for use in tracking said INVITE messages.

7. The system of claim 5, wherein said means for detecting creates a call-info table for use in tracking said INVITE messages.

* * * * *